United States Patent
Chen et al.

(10) Patent No.: US 10,899,199 B2
(45) Date of Patent: Jan. 26, 2021

(54) CONTROL METHOD AND SYSTEM FOR AIR-CONDITIONER WATER CHILLING UNITS AND AIR CONDITIONING SYSTEM

(71) Applicant: GREE ELECTRIC APPLIANCES, INC. OF ZHUHAI, Zhuhai (CN)

(72) Inventors: Junping Chen, Zhuhai (CN); Zhengqing Tang, Zhuhai (CN); Peisheng Chen, Zhuhai (CN); Tian Wu, Zhuhai (CN); Yali Sun, Zhuhai (CN); Guisheng Lu, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 16/348,912

(22) PCT Filed: Oct. 16, 2017

(86) PCT No.: PCT/CN2017/106313
§ 371 (c)(1),
(2) Date: May 10, 2019

(87) PCT Pub. No.: WO2018/086439
PCT Pub. Date: May 17, 2018

(65) Prior Publication Data
US 2019/0275865 A1     Sep. 12, 2019

(30) Foreign Application Priority Data

Nov. 14, 2016   (CN) .......................... 2016 1 1002861

(51) Int. Cl.
*F24F 11/32*     (2018.01)
*F24F 11/65*     (2018.01)
(Continued)

(52) U.S. Cl.
CPC ........... *B60H 1/3219* (2013.01); *B60H 1/323* (2013.01); *B60H 1/3216* (2013.01); *F24F 11/32* (2018.01);
(Continued)

(58) Field of Classification Search
CPC . F24F 11/00; F24F 11/32; F24F 11/65; B60H 1/32; B60H 1/3205; B60H 1/3216; B60H 1/3219; B60H 1/323
(Continued)

(56) References Cited

U.S. PATENT DOCUMENTS 9,488,399 B2 *   11/2016   Kanazawa ................ F24F 1/18
2006/0191275 A1   8/2006   Jung et al.
(Continued)

FOREIGN PATENT DOCUMENTS

CN     1477047 A     2/2004
CN     1677956 A     10/2005
(Continued)

OTHER PUBLICATIONS

Extended European Search Report dated Oct. 21, 2019 in European Patent Application No. 17868927.9, 6 pages.
(Continued)

*Primary Examiner* — Edward F Landrum
*Assistant Examiner* — Daniel C Comings
(74) *Attorney, Agent, or Firm* — Oblon, McClelland, Maier & Neustadt, L.L.P.

(57) ABSTRACT

This disclosure provides a control method and control system for two or more air-conditioning water chilling units, and air conditioning system. The control method includes: receiving at least one standby request generated by at least one air-conditioner water chilling unit of the two or more air-conditioning water chilling units based on a standby condition; determining whether or not two or more standby requests are received; generating standby sequence numbers of the air-conditioning water chilling units that send the standby requests according to the standby requests in case where two or more standby requests are received; and closing the air-conditioning water chilling units that send the
(Continued)

standby requests according to a preset rule based on the standby sequence numbers.

10 Claims, 11 Drawing Sheets

(51) Int. Cl.
    *B60H 1/32*     (2006.01)
    *F24F 11/64*     (2018.01)
    *F24F 11/63*     (2018.01)
    *G05B 15/02*     (2006.01)

(52) U.S. Cl.
    CPC .............. *F24F 11/63* (2018.01); *F24F 11/64* (2018.01); *F24F 11/65* (2018.01); *G05B 15/02* (2013.01)

(58) Field of Classification Search
    USPC .......................................................... 62/175
    See application file for complete search history.

(56) References Cited

U.S. PATENT DOCUMENTS

| | | | |
|---|---|---|---|
| 2015/0253024 A1* | 9/2015 | Murakami | F24F 11/77 165/251 |
| 2016/0147564 A1 | 5/2016 | Marr et al. | |
| 2017/0031337 A1* | 2/2017 | Jablokov | G08C 17/02 |

FOREIGN PATENT DOCUMENTS

| | | |
|---|---|---|
| CN | 1825015 A | 8/2006 |
| CN | 101315560 A | 12/2008 |
| CN | 101403556 A | 4/2009 |
| CN | 102147143 A | 8/2011 |
| CN | 103795233 A | 5/2014 |
| CN | 103940023 A | 7/2014 |
| CN | 104697128 A | 6/2015 |
| CN | 104807136 A | 7/2015 |
| CN | 106322668 A | 1/2017 |
| CN | 106765867 A | 5/2017 |
| JP | 8-247565 A | 9/1996 |
| JP | 2009-145005 A | 7/2009 |
| JP | 4410295 B1 | 2/2010 |
| JP | 2013-83437 A | 5/2013 |
| KR | 10-2006-0058203 A | 5/2006 |
| WO | WO 2011/026421 A1 | 3/2011 |
| WO | WO 2014/203828 A1 | 12/2014 |
| WO | WO 2015/198742 A1 | 12/2015 |

OTHER PUBLICATIONS

International Search Report dated Jan. 16, 2018 in PCT/CN2017/106313, 2 pages.

* cited by examiner

CONTROL METHOD AND SYSTEM FOR AIR-CONDITIONER WATER CHILLING UNITS AND AIR CONDITIONING SYSTEM

CROSS-REFERENCE TO RELATED APPLICATIONS

This application is based on and claims the priority to the Chinese Patent Application No. 201611002861.9 filed on Nov. 14, 2016, the disclosure of which is hereby incorporated into this application in its entirety.

TECHNICAL FIELD

The present application relates to the technical field of air conditioning, and particularly to a control method and system for two or more air-conditioner water chilling units, and air conditioning system.

BACKGROUND

At present, the temperature control of the air conditioning refrigeration system determines a difference between water temperature of the air-conditioner water chilling unit's own and water temperature of a control target generally by collecting water temperature values, for mechanical start or standby. However, when a plurality of air-conditioner water chilling units share the waterway, due to the existence of installation position deviations of temperature sensor packages, or due to a difference of the temperature sensor packages itself in the detection period, an air-conditioner water chilling unit always reaches the closing condition earlier than other air-conditioner water chilling units, resulting in a short run time of the air-conditioner water chilling unit, a longer run time of other air-conditioner water chilling units, which in turn leads to frequent start and stop of some air-conditioner water chilling units, shortens the service time of air-conditioner water chilling units, and results in a poor overall equilibrium control effect.

SUMMARY

One or more embodiment of this disclosure provides a control method for two or more air-conditioner water chilling units, comprising: receiving at least one standby request generated by at least one air-conditioner water chilling unit of the two or more air-conditioner water chilling units based on a standby condition; determining whether or not two or more standby requests are received; generating standby sequence numbers of the air-conditioner water chilling units that send the standby requests according to the standby requests in case where two or more standby requests are received; and closing the air-conditioner water chilling units that send the standby requests according to a preset rule based on the standby sequence numbers.

Alternatively, after receiving at least one standby request generated by at least one unit of the two or more air-conditioner water chilling units based on a standby condition, the control method further comprises: determining whether or not the at least one standby request includes a fault protection standby request; if the at least one standby request does not include a fault protection standby request, determining whether or not the number of air-conditioner water chilling units currently started is greater than or equal to two; and if the number of air-conditioner water chilling units currently started is greater than or equal to two, determining whether or not two or more standby requests are received.

Alternatively, closing the air-conditioner water chilling units that send the standby requests according to a preset rule based on the standby sequence numbers comprises: acquiring a month value of the current time; comparing the standby sequence numbers, closing the air-conditioner water chilling units that send the standby requests in the order of the standby sequence numbers from small to large when the month value is an odd number, and closing the air-conditioner water chilling units that send the standby requests in the order of the standby sequence numbers from large to small when the month value is an even number.

Alternatively, the control method further comprises: if the at least one standby request includes a fault protection standby request, generating at least one standby sequence number corresponding to the at least one air-conditioner water chilling unit that sends the at least one standby request based on the at least one standby request, and closing the at least one air-conditioner water chilling unit that sends the standby request based on the at least one standby sequence number.

Alternatively, the control method further comprises: if the number of air-conditioner water chilling units currently started is less than two, generating the standby sequence number corresponding to the air-conditioner water chilling unit that sends the standby request based on the standby request, and closing the air-conditioner water chilling unit that sends the standby request based on the standby sequence number.

Alternatively, generating the standby request based on the standby condition comprises: acquiring a temperature parameter of the air-conditioner water chilling unit that sends the standby request, determining whether or not the temperature parameter of the air-conditioner water chilling unit that sends the standby request meets a first standby condition; generating the standby request when the temperature parameter of the air-conditioner water chilling unit that sends the standby request meets the first standby condition; acquiring a protection parameter of the air-conditioner water chilling unit that sends the standby request; determining whether or not the protection parameter of the air-conditioner water chilling unit that sends the standby request meets the fault protection standby condition; and generating the fault protection standby request when the protection parameter of the air-conditioner water chilling unit that sends the standby request meets the fault protection standby condition.

One or more embodiment of this disclosure provides a control system for two or more air-conditioner water chilling units, comprising: a receiving module, configured to receive at least one standby request generated by at least one air-conditioner water chilling unit of the two or more air-conditioner water chilling units based on a standby condition; a first determining module, configured to determine whether or not two or more standby requests are received; a generating module, configured to generate standby sequence numbers of the air-conditioner water chilling units that send the standby requests according to the standby requests in case where two or more standby requests are received; and a control module, configured to close the air-conditioner water chilling units that send the standby requests according to a preset rule based on the standby sequence numbers.

Alternatively, the control system comprises: a second determining module, configured to determine whether or not the at least one standby request includes a fault protection standby request; and a third determining module, configured to determine whether or not the number of air-conditioner water chilling units currently started is greater than or equal to two in case where the at least one standby request does not include a fault protection standby request; wherein the first determining module is used for, if the number of air-conditioner water chilling units currently started is greater than or equal to two, determining whether or not two or more standby requests are received.

Alternatively, the control system comprises: a first acquiring module, configured to acquire a month value of the current time; a control module, configured to compare the standby sequence numbers, close the air-conditioner water chilling units that send the standby requests in the order of the standby sequence numbers from small to large when the month value is an odd number, and close the air-conditioner water chilling units that send the standby requests in the order of the standby sequence numbers from large to small when the month value is an even number.

Alternatively, the generating module is further used for, if the at least one standby request includes a fault protection standby request, generating at least one standby sequence number corresponding to the at least one air-conditioner water chilling unit that sends the at least one standby request based on the at least one standby request, and the control module is further used for closing the at least one air-conditioner water chilling unit that sends the standby request based on the at least one standby sequence number.

Alternatively, the generating module is further configured to generate the standby sequence number corresponding to the air-conditioner water chilling unit that sends the standby request based on the standby request in case where the number of air-conditioner water chilling units currently started is less than two, and the control module is further configured to close the air-conditioner water chilling unit that sends the standby request based on the standby sequence number.

Alternatively, the receiving module comprises: a second acquiring module, configured to acquire a temperature parameter of the air-conditioner water chilling unit that sends the standby request; a first determining module, configured to determine whether or not the temperature parameter of the air-conditioner water chilling unit that sends the standby request meets a first standby condition; a first generating module, configured to generate the standby request when the temperature parameter of the air-conditioner water chilling unit that sends the standby request meets the first standby condition; a third acquiring module, configured to acquire a protection parameter of the air-conditioner water chilling unit that sends the standby request; a second determining module, configured to determine whether or not the protection parameter of the air-conditioner water chilling unit that sends the standby request meets the fault protection standby condition; and a second generating module, configured to generate the fault protection standby request when the protection parameter of the air-conditioner water chilling unit that sends the standby request meets the fault protection standby condition.

One or more embodiment of this disclosure provides an air conditioning system, comprising the control system for two or more air-conditioner water chilling units as described in any one of the above.

One or more embodiment of this disclosure provides a control system for two or more air-conditioner water chilling units comprising: a memory, and a processor coupled to the memory, the processor being configured to perform the control method described in any of the above based on instructions stored in the memory.

One or more embodiment of this disclosure provides a computer-readable storage medium on which computer program instructions are stored, which, when executed by one or more processors, implement steps of the control method described in any of the above.

The other features of this disclosure and their advantages will become clear through a detailed description of the exemplary embodiments of this disclosure with reference to the following drawings.

BRIEF DESCRIPTION OF THE DRAWINGS

The accompanying drawings here serve to provide a further understanding of this disclosure and constitute a part of this application. The exemplary embodiments of this disclosure and the description thereof serve to explain this disclosure and do not constitute inappropriate limitations to this disclosure, in which.

DETAILED DESCRIPTION

The technical solutions in the embodiments of this disclosure are clearly and completely described in the following with reference to the accompanying drawings in the embodiments of this disclosure. Evidently, the embodiments in the following description are only a part rather than all of the embodiments of this disclosure. Based on the embodiments of this disclosure, all other embodiments obtained by persons of ordinary skill in the art without creative efforts shall fall within the protection scope of this disclosure.

One or more embodiment of this disclosure provides a control method and system for two or more air-conditioner water chilling units, and air conditioning system. When a plurality of air-conditioner water chilling units are used in combination, it can avoid frequent start and stop of the air-conditioner water chilling units, increases the service time of the air-conditioner water chilling units and improves the overall equilibrium control effect.

Figure 1:
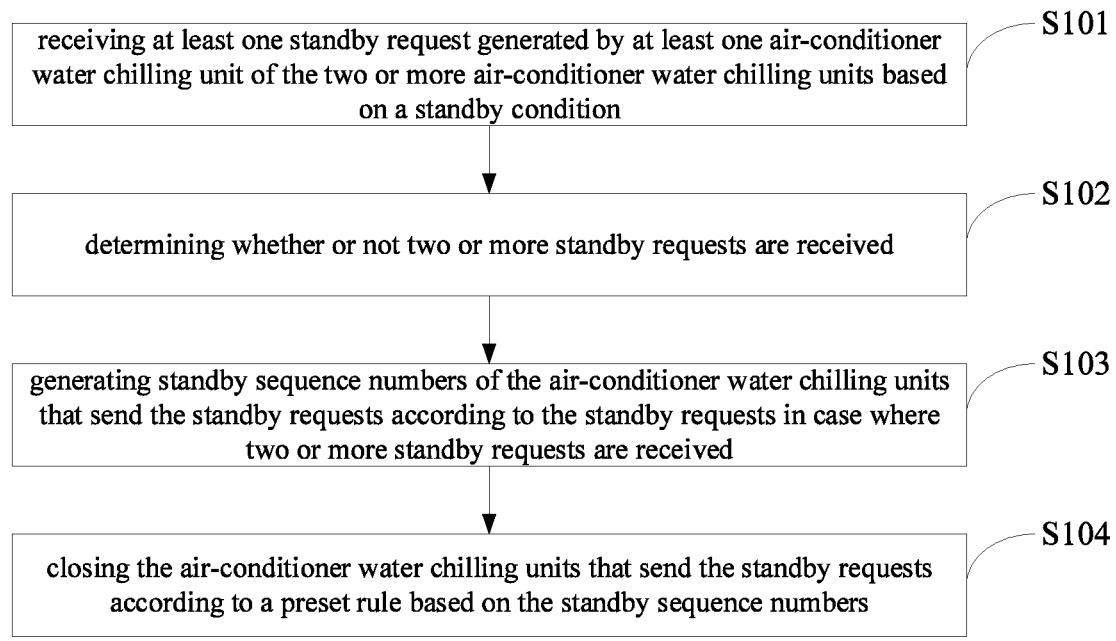
FIG. 1 is a method flowchart showing an embodiment of a control method for two or more air-conditioner water chilling units provided according to this disclosure.

FIG. 1 is a method flowchart of an embodiment of a control method for two or more air-conditioner water chilling units provided by this disclosure, comprising step S101, receiving at least one standby request generated by at least one air-conditioner water chilling unit of the two or more air-conditioner water chilling units based on a standby condition.

When it is needed to control the air-conditioner water chilling units, in a turn-on mode of an air-conditioner water chilling unit, when the air-conditioner water chilling unit sends a standby request, first accept the standby request generated by the air-conditioner water chilling unit based on the standby condition. The standby request may be that the inlet water temperature of the air-conditioner water chilling unit meets the standby condition, for example, in the refrigeration mode, when the detected inlet water temperature of the air-conditioner water chilling unit is less than a set target inlet water temperature, it is considered the standby condition is met. Alternatively, when the air-conditioner water chilling unit is in emergency, e.g., if the evaporation temperature of the air-conditioner water chilling unit is low but not yet in fault, it is considered that the standby condition is met.

The control method further comprises step S102, determining whether or not two or more standby requests are received.

Then it is further determined whether or not two or more units send the standby requests. It should be noted that, the standby request at this time does not include a fault protection standby request.

The control method further comprises step S103, generating standby sequence numbers of the air-conditioner water chilling units that send the standby requests according to the standby requests in case where two or more standby requests are received.

A respective standby sequence number is generated for each unit that sends a standby request according to the standby request in case where two or more standby requests are received.

The control method further comprises step S104, closing the air-conditioner water chilling units that send the standby requests according to a preset rule based on the standby sequence numbers.

Finally close the air-conditioner water chilling units that send the standby requests according to a preset rule based on the generated standby sequence numbers.

To sum up, in the above embodiment, when it is needed to control the air-conditioner water chilling units, first receive standby requests generated by the air-conditioner water chilling units based on a standby condition; determine whether or not two or more standby requests are received; generate standby sequence numbers of the air-conditioner water chilling units according to the standby requests in case where two or more standby requests are received; and finally close the air-conditioner water chilling units according to a preset rule based on the standby sequence numbers. As compared with the related art in which the control purely based on the outlet water temperature, it can avoid frequent start and stop of the air-conditioner water chilling units, and it increases the service life of the air-conditioner water chilling units.

Figure 2:
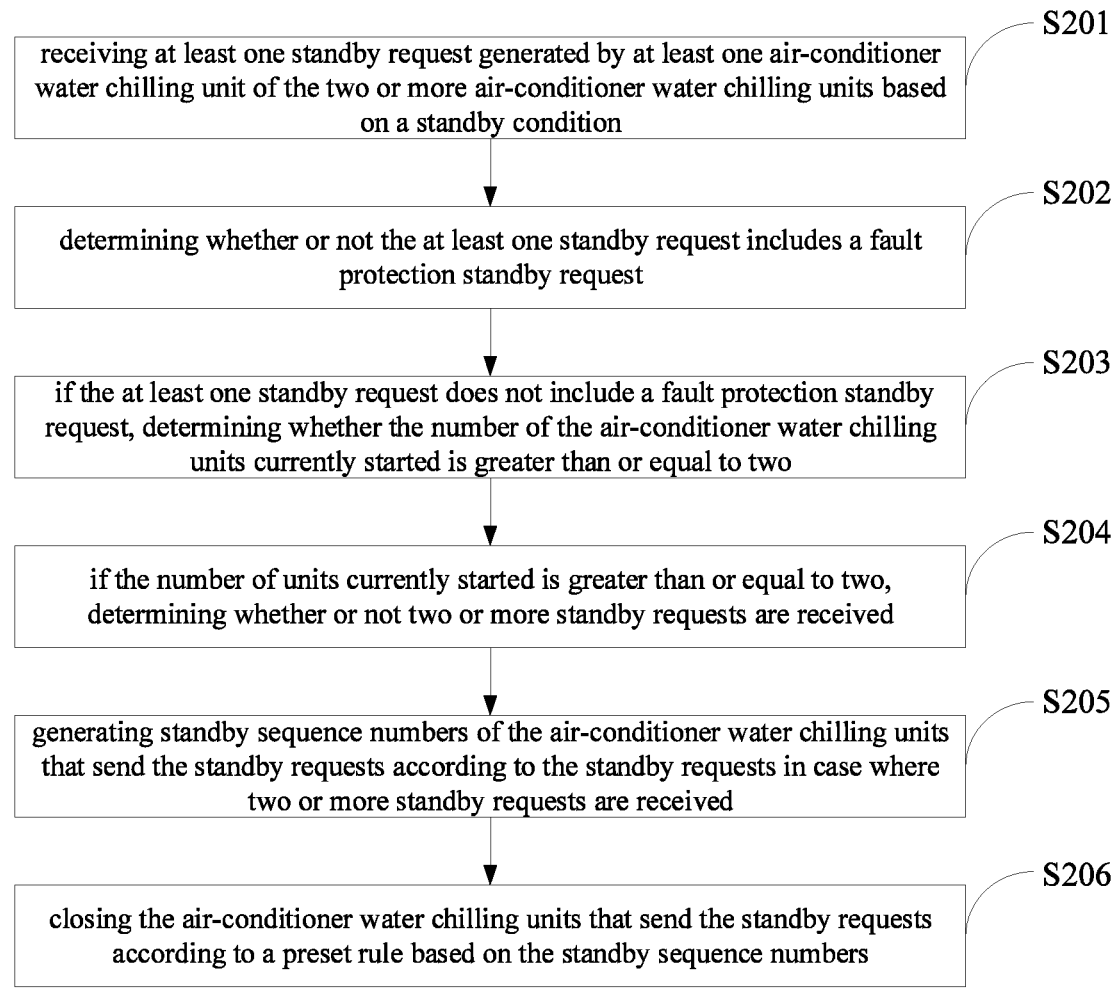
FIG. 2 is a method flowchart showing another embodiment of a control method for two or more air-conditioner water chilling units provided according to this disclosure.

FIG. 2 is a method flowchart of another embodiment of a control method for two or more air-conditioner water chilling units provided by this disclosure, comprising step S201, receiving at least one standby request generated by at least one air-conditioner water chilling unit of the two or more air-conditioner water chilling units based on a standby condition.

When it is needed to control the air-conditioner water chilling units, in a turn-on mode of an air-conditioner water chilling unit, when the air-conditioner water chilling unit sends a standby request, first accept the standby request generated by the air-conditioner water chilling unit based on the standby condition. The standby request may be that the inlet water temperature of the air-conditioner water chilling unit meets the standby condition, for example, in the refrigeration mode, when the detected inlet water temperature of the air-conditioner water chilling unit is less than a set target inlet water temperature, it is considered the standby condition is met. Alternatively, when the air-conditioner water chilling unit is in emergency, e.g., if the evaporation temperature of the air-conditioner water chilling unit is low but not yet in fault, it is considered that the standby condition is met.

The control method further comprises step S202, determining whether or not the at least one standby request includes a fault protection standby request.

After receiving the standby requests generated by the air-conditioner water chilling units based on a standby condition, further determine whether or not the standby request includes a fault protection standby request, i.e., the fault protection standby request generated by an air-conditioner water chilling unit in emergency.

The control method further comprises step S203, if the at least one standby request does not include a fault protection standby request, determining whether the number of the air-conditioner water chilling units currently started is greater than or equal to two.

If the standby request does not include a fault protection standby request, further determine the number of the air-conditioner water chilling units currently started, i.e., determining whether or not the number of the air-conditioner water chilling units currently started is greater than or equal to two.

The control method further comprises step S204, if the number of units currently started is greater than or equal to two, determining whether or not two or more standby requests are received.

If the number of units currently started is greater than or equal to two, further determine whether or not two or more units send the standby requests. It should be noted that, the standby request at this time does not include a fault protection standby request.

The control method further comprises step S205, generating standby sequence numbers of the air-conditioner water chilling units that send the standby requests according to the standby requests in case where two or more standby requests are received.

A respective standby sequence number is generated for each unit that sends a standby request according to the standby request in case where two or more standby requests are received.

The control method further comprises step S206, closing the air-conditioner water chilling units that send the standby requests according to a preset rule based on the standby sequence numbers.

Finally close the air-conditioner water chilling units that send the standby requests according to a preset rule based on the generated standby sequence numbers.

To sum up, in the above embodiment, when it is needed to control the air-conditioner water chilling units, first receive standby requests generated by the air-conditioner water chilling units based on a standby condition; and determine whether or not the standby request includes a fault protection standby request; if the standby request does not include a fault protection standby request, further determine whether the number of the air-conditioner water chilling units currently started is greater than or equal to two; if the number of units currently started is greater than or equal to two, further determine whether or not two or more standby requests are received; generate standby sequence numbers of the air-conditioner water chilling units according to the standby requests in case where two or more standby requests are received; and finally close the air-conditioner water chilling units according to a preset rule based on the standby sequence numbers. As compared with the related art in which the control purely based on the outlet water temperature, it can avoid frequent start and stop of the air-conditioner water chilling units, and it increases the service life of the air-conditioner water chilling units.

Figure 3:
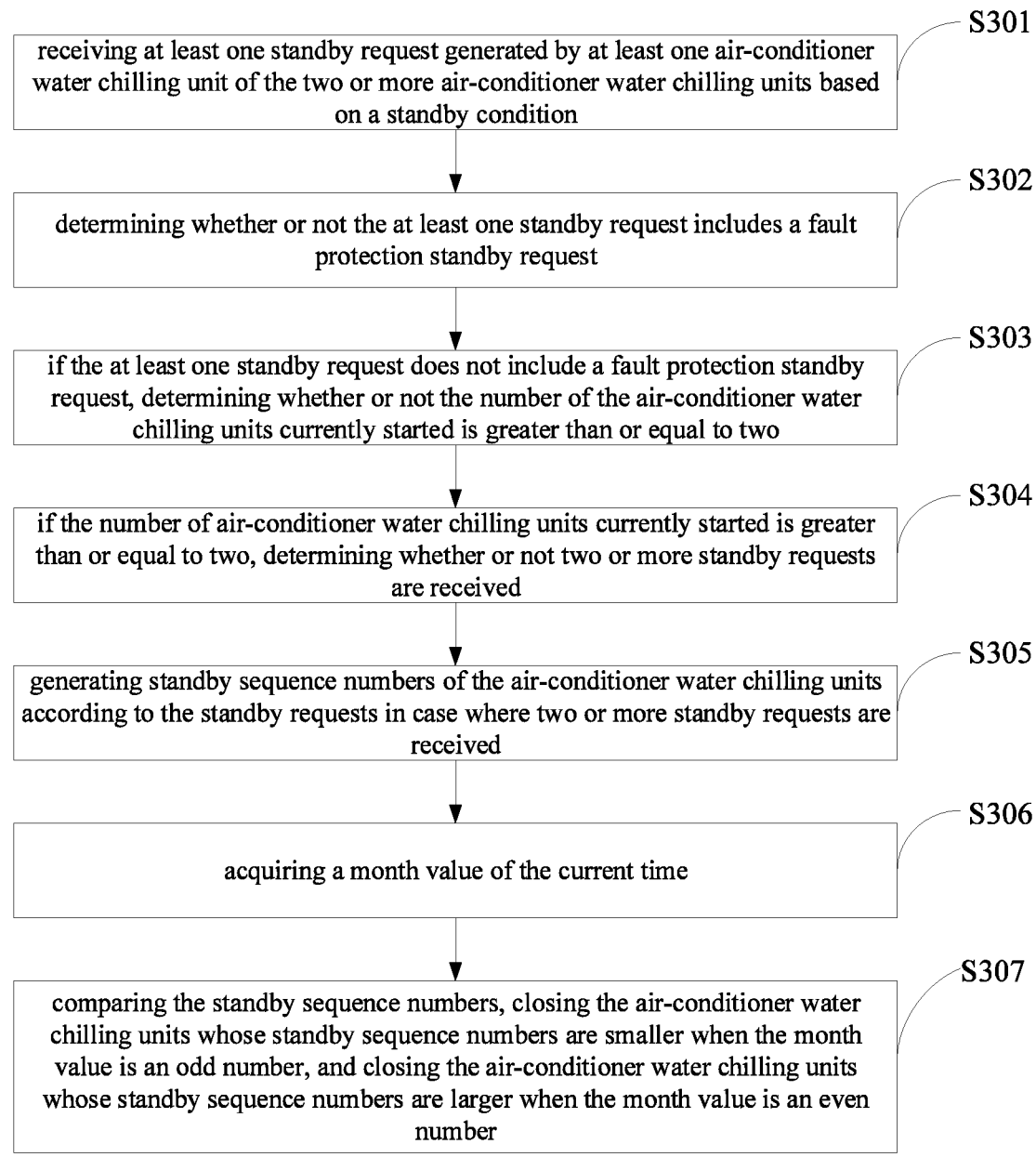
FIG. 3 is a method flowchart showing another embodiment of a control method for two or more air-conditioner water chilling units provided according to this disclosure.

FIG. 3 is a method flowchart of another embodiment of a control method for two or more air-conditioner water chilling units provided by this disclosure, comprising step S301, receiving at least one standby request generated by at least one air-conditioner water chilling unit of the two or more air-conditioner water chilling units based on a standby condition.

When it is needed to control the air-conditioner water chilling units, in a turn-on mode of an air-conditioner water chilling unit, when the air-conditioner water chilling unit sends a standby request, first accept the standby request generated by the air-conditioner water chilling unit based on the standby condition. The standby request may be that the inlet water temperature of the air-conditioner water chilling unit meets the standby condition, for example, in the refrigeration mode, when the detected inlet water temperature of the air-conditioner water chilling unit is less than a set target inlet water temperature, it is considered the standby condition is met. Alternatively, when the air-conditioner water chilling unit is in emergency, e.g., if the evaporation temperature of the air-conditioner water chilling unit is low but not yet in fault, it is considered that the standby condition is met.

The control method further comprises step S302, determining whether or not the at least one standby request includes a fault protection standby request.

After receiving the standby requests generated by the air-conditioner water chilling units based on a standby condition, further determining whether or not the standby request includes a fault protection standby request, i.e., the fault protection standby request generated by an air-conditioner water chilling unit in emergency.

The control method further comprises step S303, if the at least one standby request does not include a fault protection standby request, determining whether or not the number of the air-conditioner water chilling units currently started is greater than or equal to two.

If the standby request does not include a fault protection standby request, further determine the number of the air-conditioner water chilling units currently started, i.e., whether or not the number of the air-conditioner water chilling units currently started is greater than or equal to two.

The control method further comprises step S304, if the number of air-conditioner water chilling units currently started is greater than or equal to two, determining whether or not two or more standby requests are received.

If the number of air-conditioner water chilling units currently started is greater than or equal to two, further determining whether or not two or more units send the standby requests. It should be noted that, the standby request at this time does not include a fault protection standby request.

The control method further comprises step S305, generating standby sequence numbers of the air-conditioner water chilling units according to the standby requests in case where two or more standby requests are received.

A respective standby sequence number is generated for each unit that sends a standby request according to the standby request in case where two or more standby requests are received.

The control method further comprises step S306, acquiring a month value of the current time.

After generating the standby sequence numbers of the air-conditioner water chilling units according to the standby request in case where two or more standby requests are received, further acquire a month value of the current time.

The control method further comprises step S307, comparing the standby sequence numbers, closing the air-conditioner water chilling units whose standby sequence numbers are smaller when the month value is an odd number, and closing the air-conditioner water chilling units whose standby sequence numbers are larger when the month value is an even number.

Compare the standby sequence numbers, close the air-conditioner water chilling units whose standby sequence numbers are smaller when the acquired month value of the current time is an odd number, and close the air-conditioner water chilling units whose standby sequence numbers are larger when the acquired month value of the current time is an even number. The air-conditioner water chilling units can be closed also according to the month value and the order of the standby sequence number, for example, closing the air-conditioner water chilling units in the order of the standby sequence numbers from small to large when the month value is an odd number, i.e., preferably closing the air-conditioner water chilling units with smaller standby sequence numbers, and closing the air-conditioner water chilling units in the order of the standby sequence numbers from large to small when the month value is an even number, i.e., preferably closing the air-conditioner water chilling units with larger standby sequence numbers.

To sum up, in the above embodiment, when it is needed to control the air-conditioner water chilling units, first receive standby requests generated by the air-conditioner water chilling units based on a standby condition; and determine whether or not the standby request includes a fault protection standby request; if the standby request does not include a fault protection standby request, further determine whether the number of the air-conditioner water chilling units currently started is greater than or equal to two; if the number of units currently started is greater than or equal to two, further determine whether or not two or more standby requests are received; generate standby sequence numbers of the air-conditioner water chilling units according to the standby requests in case where two or more standby requests are received; and finally acquire a month value of the current time; compare the standby sequence numbers, and close the air-conditioner water chilling units whose standby sequence numbers are smaller when the month value is an odd number, and close the air-conditioner water chilling units whose standby sequence numbers are larger when the month value is an even number. As compared with the related art in which the control purely based on the outlet water temperature, it can avoid frequent start and stop of the air-conditioner water chilling units, and it increases the service life of the air-conditioner water chilling units.

Figure 4:
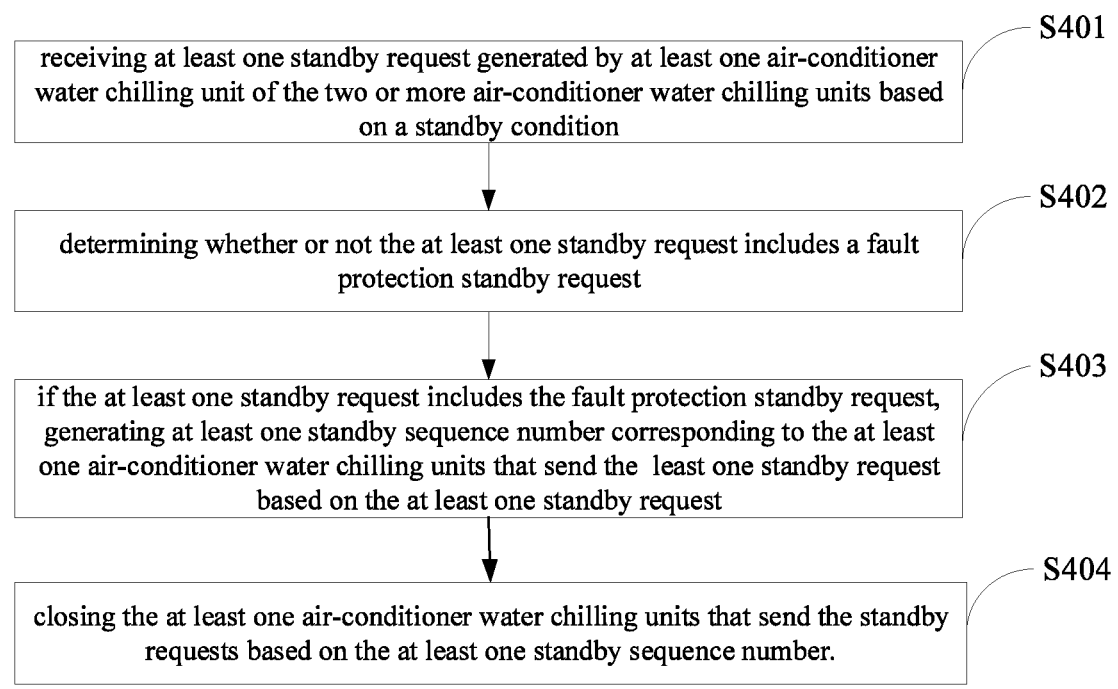
FIG. 4 is a method flowchart showing a further embodiment of a control method for two or more air-conditioner water chilling units provided according to this disclosure.

FIG. 4 is a method flowchart of a further embodiment of a control method for two or more air-conditioner water chilling units provided by this disclosure, comprising step S401, receiving at least one standby request generated by at least one air-conditioner water chilling unit of the two or more air-conditioner water chilling units based on a standby condition.

When it is needed to control the air-conditioner water chilling units, in a turn-on mode of an air-conditioner water chilling unit, when the air-conditioner water chilling unit sends a standby request, first accept the standby request generated by the air-conditioner water chilling unit based on the standby condition. The standby request may be that the inlet water temperature of the air-conditioner water chilling unit meets the standby condition, for example, in the refrigeration mode, when the detected inlet water temperature of the air-conditioner water chilling unit is less than a set target inlet water temperature, it is considered the standby condition is met. Alternatively, when the air-conditioner water chilling unit is in emergency, e.g., if the evaporation temperature of the air-conditioner water chilling unit is low but not yet in fault, it is considered that the standby condition is met.

Specifically, generating the standby request based on the standby condition may comprise: acquiring a temperature parameter of the air-conditioner water chilling unit, determining whether or not the temperature parameter of the air-conditioner water chilling unit meets a first standby condition; generating the standby request of the air-conditioner water chilling unit when the temperature parameter of the air-conditioner water chilling unit meets the first standby condition; acquiring a protection parameter of the air-conditioner water chilling unit; determining whether or not the protection parameter of the air-conditioner water chilling unit meets the fault protection standby condition; and generating a fault protection standby request when the protection parameter of the air-conditioner water chilling unit meets the fault protection standby condition.

The control method further comprises step S402, determining whether or not the at least one standby request includes a fault protection standby request.

After receiving the standby requests generated by the air-conditioner water chilling units based on a standby condition, further determining whether or not the standby request includes a fault protection standby request, i.e., the fault protection standby request generated by an air-conditioner water chilling unit in emergency.

The control method further comprises step S403, if the at least one standby request includes the fault protection standby request, generating at least one standby sequence number corresponding to the at least one air-conditioner water chilling units that send the at least one standby request based on the at least one standby request.

If it is determined that the standby request includes the fault protection standby request, it is currently needed to perform fault protection for the air-conditioner water chilling units, and at this time a respective standby sequence number is generated for each unit that sends the standby request based on the received standby requests.

The control method further comprises step S404, closing the at least one air-conditioner water chilling units that send the standby requests based on the at least one standby sequence number.

Finally close the air-conditioner water chilling units that send the standby requests according to a preset rule based on the generated standby sequence numbers.

To sum up, in the above embodiment, further, if it is determined that the standby request includes the fault protection standby request, then generate standby sequence numbers corresponding to the air-conditioner water chilling units that send the standby request based on the standby requests and close the air-conditioner water chilling units that send the standby requests based on the standby sequence numbers.

Figure 5:
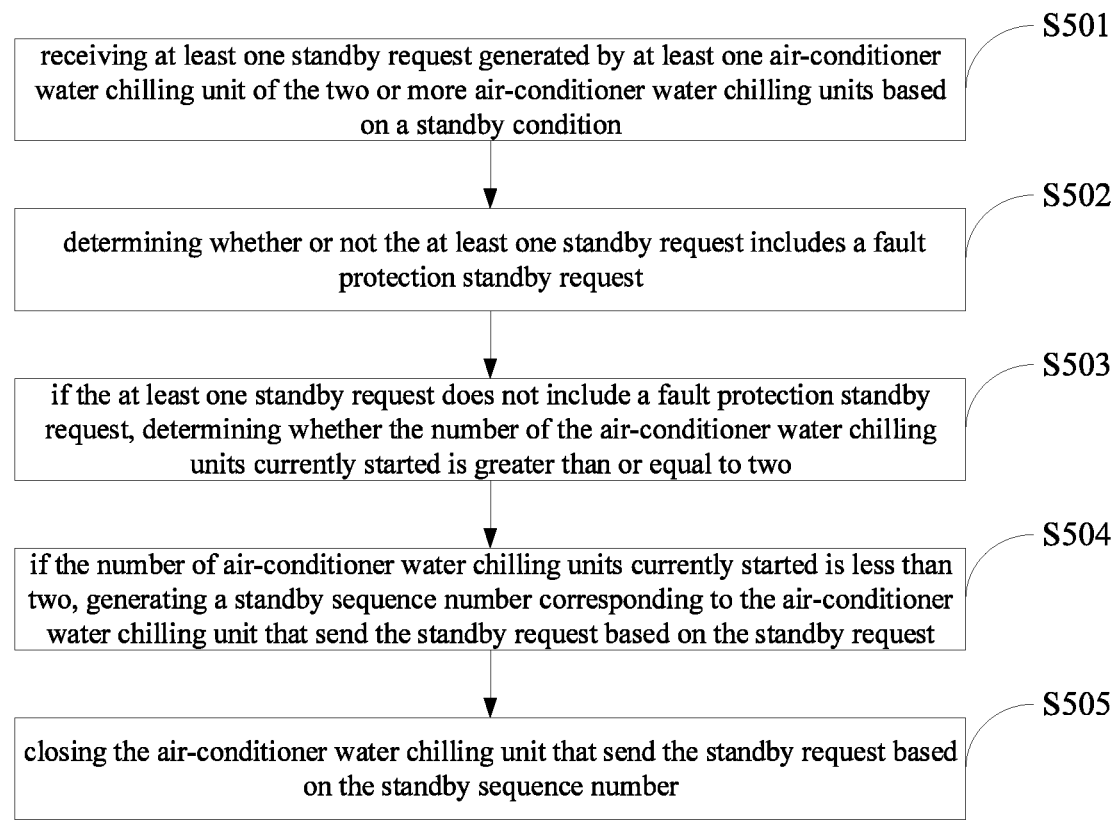
FIG. 5 is a method flowchart showing a still another embodiment of a control method for two or more air-conditioner water chilling units provided according to this disclosure.

FIG. 5 is a method flowchart of still another embodiment of a control method for two or more air-conditioner water chilling units provided by this disclosure, comprising step S501, receiving at least one standby request generated by at least one air-conditioner water chilling unit of the two or more air-conditioner water chilling units based on a standby condition.

When it is needed to control the air-conditioner water chilling units, in a turn-on mode of an air-conditioner water chilling unit, when the air-conditioner water chilling unit sends a standby request, first accept the standby request generated by the air-conditioner water chilling unit based on the standby condition. The standby request may be that the inlet water temperature of the air-conditioner water chilling unit meets the standby condition, for example, in the refrigeration mode, when the detected inlet water temperature of the air-conditioner water chilling unit is less than a set target inlet water temperature, it is considered the standby condition is met. Alternatively, when the air-conditioner water chilling unit is in emergency, e.g., if the evaporation temperature of the air-conditioner water chilling unit is low but not yet in fault, it is considered that the standby condition is met.

Specifically, generating the standby request based on the standby condition may comprise: acquiring a temperature parameter of the air-conditioner water chilling unit, determining whether or not the temperature parameter of the air-conditioner water chilling unit meets a first standby condition; generating the standby request of the air-conditioner water chilling unit when the temperature parameter of the air-conditioner water chilling unit meets the first standby condition; acquiring a protection parameter of the air-conditioner water chilling unit; determining whether or not the protection parameter of the air-conditioner water chilling unit meets the fault protection standby condition; and generating a fault protection standby request when the protection parameter of the air-conditioner water chilling unit meets the fault protection standby condition.

The control method further comprises step S502, determining whether or not the at least one standby request includes a fault protection standby request.

After receiving the standby requests generated by the air-conditioner water chilling units based on a standby condition, further determining whether or not the received standby request includes a fault protection standby request, i.e., the fault protection standby request generated by an air-conditioner water chilling unit in emergency.

The control method further comprises step S503, if the at least one standby request does not include a fault protection standby request, determining whether the number of the air-conditioner water chilling units currently started is greater than or equal to two.

If the standby request does not include a fault protection standby request, further determine the number of the air-conditioner water chilling units currently started, i.e., whether or not the number of the air-conditioner water chilling units currently started is greater than or equal to two.

The control method further comprises step S504, if the number of air-conditioner water chilling units currently started is less than two, generating a standby sequence number corresponding to the air-conditioner water chilling unit that send the standby request based on the standby requests.

If it is determined that the number of air-conditioner water chilling units currently started is less than two, then generate a respective standby sequence number corresponding to each unit that sends the standby requests based on the received standby requests.

The control method further comprises step S505, closing the air-conditioner water chilling unit that send the standby request based on the standby sequence number.

Finally close the air-conditioner water chilling units that send the standby request according to a preset rule based on the generated standby sequence number.

To sum up, in the above embodiment, further if it is determined that the number of air-conditioner water chilling units currently started is less than two, then generate a standby sequence number corresponding to the air-conditioner water chilling unit that sends the standby requests based on the standby requests, and close the air-conditioner water chilling units that send the standby request based on the standby sequence numbers.

Figure 6:
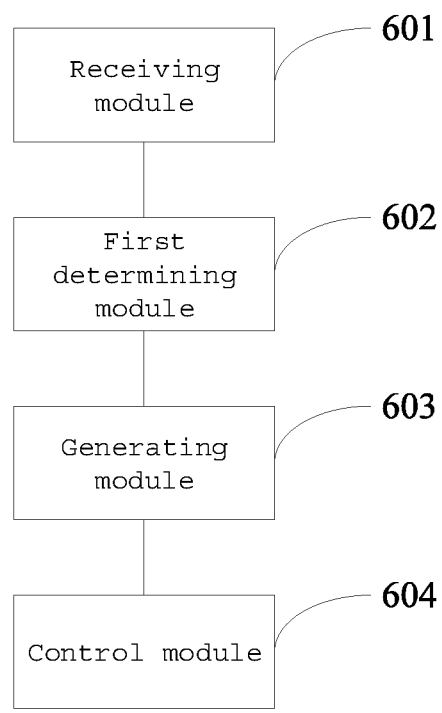
FIG. 6 is a structural schematic diagram showing an embodiment of a control system for two or more air-conditioner water chilling units provided according to this disclosure.

FIG. 6 is a structural schematic diagram showing an embodiment of a control system for two or more air-conditioner water chilling units provided according to this disclosure, comprising: a receiving module 601 for receiving at least one standby request generated by at least one air-conditioner water chilling unit of the two or more air-conditioner water chilling units based on a standby condition.

When it is needed to control the air-conditioner water chilling units, in a turn-on mode of an air-conditioner water chilling unit, when the air-conditioner water chilling unit sends a standby request, first accept the standby request generated by the air-conditioner water chilling unit based on the standby condition. The standby request may be that the inlet water temperature of the air-conditioner water chilling unit meets the standby condition, for example, in the refrigeration mode, when the detected inlet water temperature of the air-conditioner water chilling unit is less than a set target inlet water temperature, it is considered the standby condition is met. Alternatively, when the air-conditioner water chilling unit is in emergency, e.g., if the evaporation temperature of the air-conditioner water chilling unit is low but not yet in fault, it is considered that the standby condition is met.

The control system further comprises a first determining module 602 for determining whether or not two or more standby requests are received.

Then it is determined whether or not there are two or more air-conditioner water chilling units that send the standby requests. It should be noted that, the standby request at this time does not include a fault protection standby request.

The control system further comprises a generating module 603 for generating standby sequence numbers of the air-conditioner water chilling units according to the standby requests in case where two or more standby requests are received.

A respective standby sequence number is generated for each air-conditioner water chilling unit that sends a standby request according to the received standby request in case where two or more standby requests are received.

The control system further comprises a control module 604 for closing the air-conditioner water chilling units according to a preset rule based on the standby sequence numbers.

Finally close the air-conditioner water chilling units that send the standby requests according to a preset rule based on the generated standby sequence numbers.

To sum up, in the above embodiment, when it is needed to control the air-conditioner water chilling units, first receive standby requests generated by the air-conditioner water chilling units based on a standby condition; determine whether or not two or more standby requests are received; generate standby sequence numbers of the air-conditioner water chilling units according to the standby requests in case where two or more standby requests are received; and finally close the air-conditioner water chilling units according to a preset rule based on the standby sequence numbers. As compared with the related art in which the control purely based on the outlet water temperature, it can avoid frequent start and stop of the air-conditioner water chilling units, and it increases the service life of the air-conditioner water chilling units.

Figure 7:
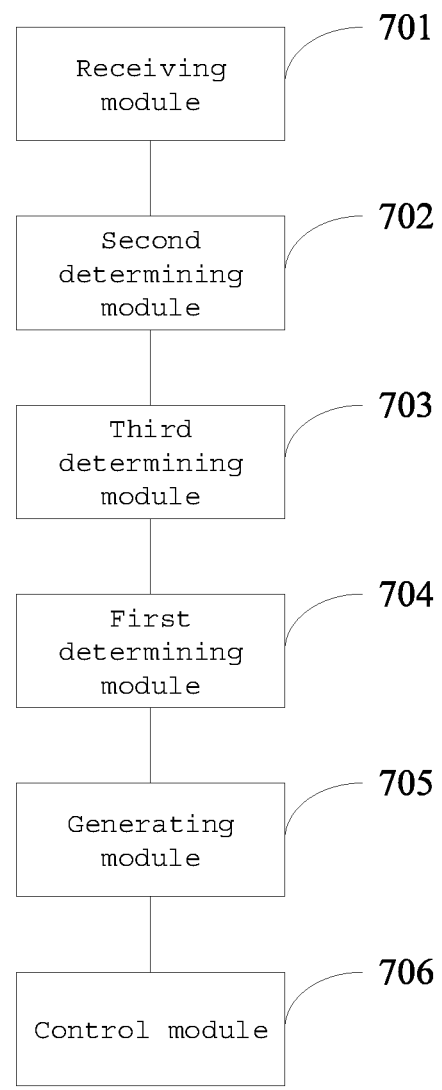
FIG. 7 is a schematic diagram showing a structure of another embodiment of a control system for two or more air-conditioner water chilling units provided according to this disclosure.

FIG. 7 is a schematic diagram showing a structure of another embodiment of a control system for two or more air-conditioner water chilling units provided according to this disclosure, comprising: a receiving module 701 for receiving at least one standby request generated by at least one air-conditioner water chilling unit of the two or more air-conditioner water chilling units based on a standby condition.

When it is needed to control the air-conditioner water chilling units, in a turn-on mode of an air-conditioner water chilling unit, when the air-conditioner water chilling unit sends a standby request, first accept the standby request generated by the air-conditioner water chilling unit based on the standby condition. The standby request may be that the inlet water temperature of the air-conditioner water chilling unit meets the standby condition, for example, in the refrigeration mode, when the detected inlet water temperature of the air-conditioner water chilling unit is less than a set target inlet water temperature, it is considered the standby condition is met. Alternatively, when the air-conditioner water chilling unit is in emergency, e.g., if the evaporation temperature of the air-conditioner water chilling unit is low but not yet in fault, it is considered that the standby condition is met.

The control system further comprises a second determining module 702 for determining whether or not the at least one standby request includes a fault protection standby request.

After receiving the standby requests generated by the air-conditioner water chilling units based on a standby condition, further determining whether or not the received standby request includes a fault protection standby request, i.e., the fault protection standby request generated by an air-conditioner water chilling unit in emergency.

The control system further comprises a third determining module 703 for, if the at least one standby request does not include a fault protection standby request, determining whether or not the number of the air-conditioner water chilling units currently started is greater than or equal to two.

If it is determined that the standby request does not include a fault protection standby request, further determining the number of the air-conditioner water chilling units currently started, i.e., whether or not the number of the air-conditioner water chilling units currently started is greater than or equal to two.

The control system further comprises a first determining module 704, for if the number of air-conditioner water chilling units currently started is greater than or equal to two, determining whether or not two or more standby requests are received.

If the number of air-conditioner water chilling units currently started is greater than or equal to two, further determining whether or not there are two or more air-conditioner water chilling units that send the standby requests. It should be noted that, the standby request at this time does not include a fault protection standby request.

The control system further comprises a generating module 705 for generating standby sequence numbers of the air-conditioner water chilling units according to the standby requests in case where two or more standby requests are received.

A respective standby sequence number is generated for each unit that sends a standby request according to the received standby request in case where two or more standby requests are received.

The control system further comprises a control module 706 for closing the air-conditioner water chilling units according to a preset rule based on the standby sequence numbers.

Finally close the air-conditioner water chilling units that send the standby requests according to a preset rule based on the generated standby sequence numbers.

To sum up, in the above embodiment, when it is needed to control the air-conditioner water chilling units, first receive standby requests generated by the air-conditioner water chilling units based on a standby condition; and determine whether or not the standby request includes a fault protection standby request; if the standby request does not include a fault protection standby request, further determine whether the number of the air-conditioner water chilling units currently started is greater than or equal to two; if the number of air-conditioner water chilling units currently started is greater than or equal to two, further determine whether or not two or more standby requests are received; generate standby sequence numbers of the air-conditioner water chilling units according to the standby requests in case where two or more standby requests are received; and finally close the air-conditioner water chilling units according to a preset rule based on the standby sequence numbers. As compared with the related art in which the control purely based on the outlet water temperature, it can avoid frequent start and stop of the air-conditioner water chilling units, and it increases the service life of the air-conditioner water chilling units.

Figure 8:
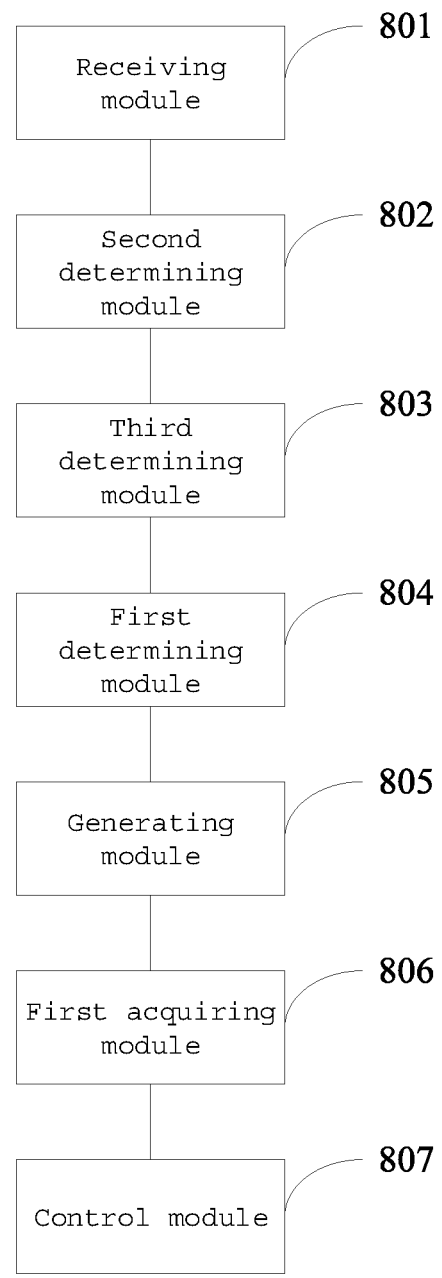
FIG. 8 is a schematic diagram showing a structure of another embodiment of a control system for two or more air-conditioner water chilling units provided according to this disclosure.

FIG. 8 is a schematic diagram showing a structure of another embodiment of a control system for two or more air-conditioner water chilling units provided according to this disclosure, comprising: a receiving module 801 for receiving at least one standby request generated by at least one air-conditioner water chilling unit of the two or more air-conditioner water chilling units based on a standby condition.

When it is needed to control the air-conditioner water chilling units, in a turn-on mode of an air-conditioner water chilling unit, when the air-conditioner water chilling unit sends a standby request, first accept the standby request generated by the air-conditioner water chilling unit based on the standby condition. The standby request may be that the inlet water temperature of the air-conditioner water chilling unit meets the standby condition, for example, in the refrigeration mode, when the detected inlet water temperature of the air-conditioner water chilling unit is less than a set target inlet water temperature, it is considered the standby condition is met. Alternatively, when the air-conditioner water chilling unit is in emergency, e.g., if the evaporation temperature of the air-conditioner water chilling unit is low but not yet in fault, it is considered that the standby condition is met.

The control system further comprises a second determining module 802 for determining whether or not the at least one standby request includes a fault protection standby request.

After receiving the standby requests generated by the air-conditioner water chilling units based on a standby condition, further determining whether or not the standby request includes a fault protection standby request, i.e., the fault protection standby request generated by an air-conditioner water chilling unit in emergency.

The control system further comprises a third determining module 803 for, if the at least one standby request does not include a fault protection standby request, determining whether or not the number of the air-conditioner water chilling units currently started is greater than or equal to two.

If it is determined that the standby request does not include a fault protection standby request, further determine the number of the air-conditioner water chilling units currently started, i.e., whether or not the number of the air-conditioner water chilling units currently started is greater than or equal to two.

The control system further comprises a first determining module 804 for, if the number of air-conditioner water chilling units currently started is greater than or equal to two, determining whether or not two or more standby requests are received.

If it is determined that the number of air-conditioner water chilling units currently started is greater than or equal to two, further determine whether or not there are two or more units that send the standby requests. It should be noted that, the standby request at this time does not include a fault protection standby request.

The control system further comprises a generating module 805 for generating standby sequence numbers of the air-conditioner water chilling units according to the standby requests in case where two or more standby requests are received.

A respective standby sequence number is generated for each unit that sends a standby request according to the standby request in case where two or more standby requests are received.

The control system further comprises a first acquiring module 806 for acquiring a month value of the current time.

After generating the standby sequence numbers of the air-conditioner water chilling units according to the standby request in case where two or more standby requests are received, further acquiring a month value of the current time.

The control system further comprises a control module 807 for comparing the standby sequence numbers, closing the air-conditioner water chilling units whose standby sequence numbers are smaller when the month value is an odd number, and closing the air-conditioner water chilling units whose standby sequence numbers are larger when the month value is an even number.

Compare the standby sequence numbers, close the air-conditioner water chilling units whose standby sequence numbers are smaller when the acquired month value of the current time is an odd number, and close the air-conditioner water chilling units whose standby sequence numbers are larger when the acquired month value of the current time is an even number. The air-conditioner water chilling units can be closed also according to the month value and the order of the standby sequence numbers, for example, closing the air-conditioner water chilling units in the order of the standby sequence numbers from small to large when the month value is an odd number, i.e., preferably closing the air-conditioner water chilling units with smaller standby sequence numbers, and closing the air-conditioner water chilling units in the order of the standby sequence numbers from large to small when the month value is an even number, i.e., preferably closing the air-conditioner water chilling units with larger standby sequence numbers.

To sum up, in the above embodiment, when it is needed to control the air-conditioner water chilling units, first receive standby requests generated by the air-conditioner water chilling units based on a standby condition; and determine whether or not the standby request includes a fault protection standby request; if the standby request does not include a fault protection standby request, further determine whether the number of the air-conditioner water chilling units currently started is greater than or equal to two; if the number of air-conditioner water chilling units currently started is greater than or equal to two, further determine whether or not two or more standby requests are received; generate standby sequence numbers of the air-conditioner water chilling units according to the standby requests in case where two or more standby requests are received; and finally acquire a month value of the current time; compare the standby sequence numbers, and close the air-conditioner water chilling units whose standby sequence numbers are smaller when the month value is an odd number, and close the air-conditioner water chilling units whose standby sequence numbers are larger when the month value is an even number. As compared with the related art in which the control purely based on the outlet water temperature, it can avoid frequent start and stop of the air-conditioner water chilling units, and it increases the service life of the air-conditioner water chilling units.

Figure 9:
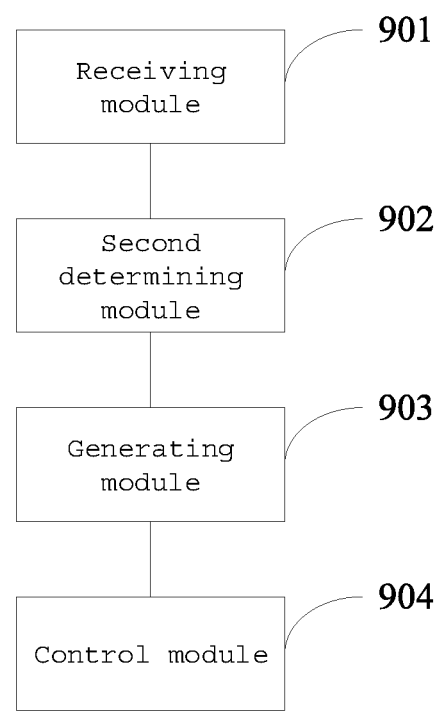
FIG. 9 is a schematic diagram showing a structure of another embodiment of a control system for two or more air-conditioner water chilling units provided according to this disclosure.

FIG. 9 is a schematic diagram showing a structure of another embodiment of a control system for two or more air-conditioner water chilling units provided according to this disclosure, comprising: a receiving module 901 for receiving at least one standby request generated by at least one air-conditioner water chilling unit of the two or more air-conditioner water chilling units based on a standby condition.

When it is needed to control the air-conditioner water chilling units, in a turn-on mode of an air-conditioner water chilling unit, when the air-conditioner water chilling unit sends a standby request, first accept the standby request generated by the air-conditioner water chilling unit based on the standby condition. The standby request may be that the inlet water temperature of the air-conditioner water chilling unit meets the standby condition, for example, in the refrigeration mode, when the detected inlet water temperature of the air-conditioner water chilling unit is less than a set target inlet water temperature, it is considered the standby condition is met. Alternatively, when the air-conditioner water chilling unit is in emergency, e.g., if the evaporation temperature of the air-conditioner water chilling unit is low but not yet in fault, it is considered that the standby condition is met.

Specifically, generating the standby request based on the standby condition may comprise: a second acquiring module for acquiring a temperature parameter of the air-conditioner water chilling unit that sends the standby request, a first determining module for determining whether or not the temperature parameter of the air-conditioner water chilling unit that sends the standby request meets a first standby condition; a first generating module for generating the standby request of the air-conditioner water chilling unit that sends the standby request when the temperature parameter of the air-conditioner water chilling unit that sends the standby request meets the first standby condition; a third acquiring module for acquiring a protection parameter of the air-conditioner water chilling unit that sends the standby request; a second determining module for determining whether or not the protection parameter of the air-conditioner water chilling unit that sends the standby request meets the fault protection standby condition; and a second generating module for generating a fault protection standby request when the protection parameter of the air-conditioner water chilling unit that sends the standby request meets the fault protection standby condition.

The control system further comprises a second determining module 902 for determining whether or not the at least one standby request includes a fault protection standby request.

After receiving the standby requests generated by the air-conditioner water chilling units based on a standby condition, further determining whether or not the received standby request includes a fault protection standby request, i.e., the fault protection standby request generated by an air-conditioner water chilling unit in emergency.

The control system further comprises a generating module 903 for, if the at least one standby request includes the fault protection standby request, generating at least one standby sequence number corresponding to the at least one air-conditioner water chilling units that send the at least one standby request based on the standby requests.

if the standby request includes the fault protection standby request, it is needed to perform fault protection for the air-conditioner water chilling units, and at this time a respective standby sequence number is generated for each unit that sends the standby request based on the received standby requests.

The control system further comprises a control module 904 for closing the at least one air-conditioner water chilling units that send the standby requests based on the at least one standby sequence number.

Finally close the air-conditioner water chilling units that send the standby requests according to a preset rule based on the generated standby sequence numbers.

To sum up, in the above embodiment, further, if it is determined that the standby request includes the fault protection standby request, then generate standby sequence numbers corresponding to the air-conditioner water chilling units that send the standby request based on the standby requests and close the air-conditioner water chilling units that send the standby requests based on the standby sequence numbers.

Figure 10:
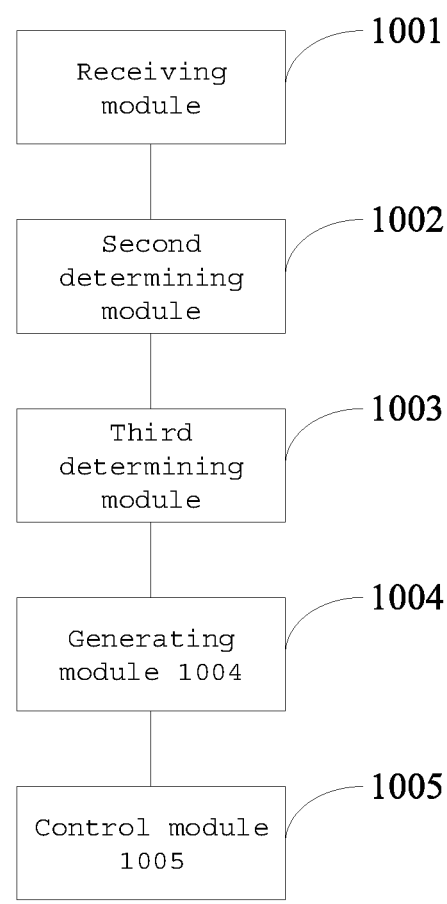
FIG. 10 is a schematic diagram showing a structure of a further embodiment of a control system for two or more air-conditioner water chilling units provided according to this disclosure.

FIG. 10 is a schematic diagram showing a structure of a further embodiment of a control system for two or more air-conditioner water chilling units provided according to this disclosure, comprising: a receiving module 1001 for receiving at least one standby request generated by at least one air-conditioner water chilling unit of the two or more air-conditioner water chilling units based on a standby condition.

When it is needed to control the air-conditioner water chilling units, in a turn-on mode of an air-conditioner water chilling unit, when the air-conditioner water chilling unit sends a standby request, first accept the standby request generated by the air-conditioner water chilling unit based on the standby condition. The standby request may be that the inlet water temperature of the air-conditioner water chilling unit meets the standby condition, for example, in the refrigeration mode, when the detected inlet water temperature of the air-conditioner water chilling unit is less than a set target inlet water temperature, it is considered the standby condition is met. Alternatively, when the air-conditioner water chilling unit is in emergency, e.g., if the evaporation temperature of the air-conditioner water chilling unit is low but not yet in fault, it is considered that the standby condition is met.

Specifically, generating the standby request based on the standby condition may comprise: a second acquiring module for acquiring a temperature parameter of the air-conditioner water chilling unit, a first determining module for determining whether or not the temperature parameter of the air-conditioner water chilling unit meets a first standby condition; a first generating module for generating the standby request of the air-conditioner water chilling unit when the temperature parameter of the air-conditioner water chilling unit meets the first standby condition; a third acquiring module for acquiring a protection parameter of the air-conditioner water chilling unit; a second determining module for determining whether or not the protection parameter of the air-conditioner water chilling unit meets the fault protection standby condition; and a second generating module for generating a fault protection standby request when the protection parameter of the air-conditioner water chilling unit meets the fault protection standby condition.

The control system further comprises a second determining module 1002 for determining whether or not the at least one standby request includes a fault protection standby request.

After receiving the standby requests generated by the air-conditioner water chilling units based on a standby condition, further determine whether or not the received standby request includes a fault protection standby request, i.e., the fault protection standby request generated by an air-conditioner water chilling unit in emergency.

The control system further comprises a third determining module 1003 for, if the at least one standby request does not include a fault protection standby request, determining whether or not the number of the air-conditioner water chilling units currently started is greater than or equal to two.

If it is determined that the standby request does not include a fault protection standby request, further determine the number of the air-conditioner water chilling units currently started, i.e., whether the number of the air-conditioner water chilling units currently started is greater than or equal to two.

The control system further comprises a generating module 1004 for, if the number of air-conditioner water chilling units currently started is less than two, generating standby sequence numbers corresponding to the air-conditioner water chilling units that send the standby requests based on the standby requests.

If it is determined that the number of air-conditioner water chilling units currently started is less than two, then generate a standby sequence number for each unit that sends the standby requests based on the received standby requests.

The control system further comprises a control module 1005 for closing the air-conditioner water chilling units that send the standby requests based on the standby sequence numbers.

Finally close the air-conditioner water chilling units that send the standby requests according to a preset rule based on the generated standby sequence numbers.

In n the above embodiment, further, if it is determined that the number of air-conditioner water chilling units currently started is less than two, then generate standby sequence numbers corresponding to the air-conditioner water chilling units that send the standby requests based on the standby requests, and close the air-conditioner water chilling units that send the standby request based on the standby sequence numbers.

The functional unit modules described above can be implemented as general processors, Programmable logic controllers (PLC), Digital Signal Processors (DSP), Application Specific Integrated Circuit (ASIC), Field Programmable Gate Arrays (FPGA) or other programmable logic devices, discrete gates or transistor logic devices, discrete hardware components, or any appropriate combinations thereof, for performing the functions described in this disclosure.

This disclosure further provides an air conditioning system, comprising the control system for two or more air-conditioner water chilling units as described in any one of the above embodiments.

Figure 11:
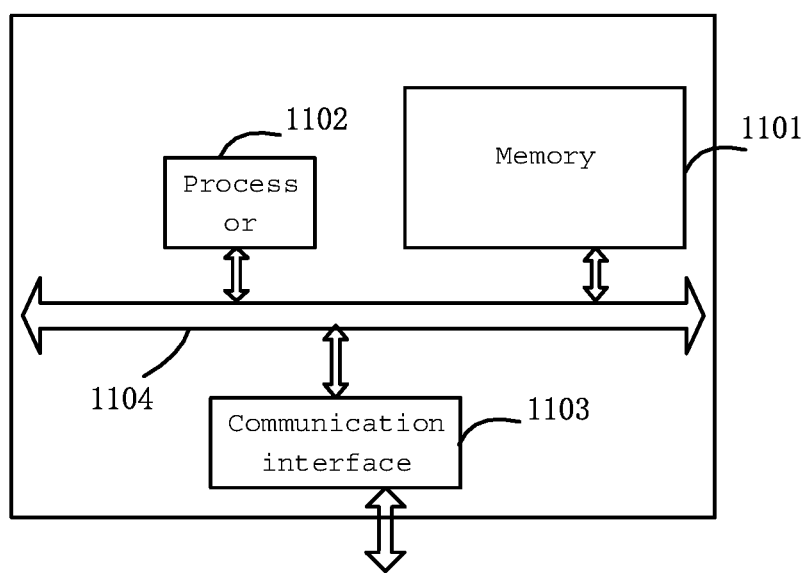
FIG. 11 is a schematic diagram showing a structure of a still another embodiment of a control system for two or more air-conditioner water chilling units provided according to this disclosure.

FIG. 11 is a schematic diagram showing a structure of a still another embodiment of a control system for two or more air-conditioner water chilling units provided according to this disclosure, comprising: a memory 1101 for storing instructions, and a processor 1102 coupled to the memory 1101, the processor 1102 being configured to perform the control method for two or more air-conditioner water chilling units described in any of the above embodiments based on instructions stored in the memory.

As shown in FIG. 11, the system further comprises a communication interface 1103 for information interaction with other devices. At the same time, the system further comprises a bus 1104. The processor 1102, the communication interface 1103, and the memory 1101 communicate with each other through the bus 1104.

The memory 1101 may contain a high-speed RAM memory as well as a Non-Volatile Memory (NVM), such as at least one disk memory. The memory 1101 can also be a memory array. The memory 1101 can also be divided into blocks, and the blocks can be combined into virtual volumes according to a certain rule. In addition, the processor 1102 can be a Center Processing Unit (CPU), or an Application Specific Integrated Circuit (ASIC), or it may be configured as one or more integrated circuits to implement the embodiments of this disclosure.

In an embodiment, this disclosure further provides a computer-readable storage medium on which computer instructions are stored, which, when executed by the processor, implement the control method for two or more air-conditioner water chilling units in any of the above embodiments.

Those skilled in the art would appreciate that the embodiments of this disclosure can take the form of a full hardware embodiment, a full software embodiment, or an embodiment in conjunction with software and hardware. Furthermore, this disclosure may take the form of a computer program product that is implemented on one or more computer-usable non-transient storage medium (including but not limited to, disk memory, CD-ROM, optical memory, and so on) that contains computer-usable program codes.

Finally, it should be further noted that in this specification, relational terms such as first and second are used only to distinguish an entity or operation from another entity or operation, without necessarily requiring or implying any such actual relationship or order between those entities or operations. Moreover, the term "including", "comprising" or any other variant thereof is intended to cover non-exclusive inclusions, so that processes, methods, articles or devices that include a range of elements include not only those elements, but also other elements that are not explicitly listed, or that further include elements inherent to these processes, methods, articles or devices. In the absence of additional restrictions, the element defined by the statement "comprising a . . . " does not preclude the existence of an additional identical element in the process, method, article or device that includes the elements in question.

To this end, the present application has been described in detail. In order to avoid shielding the idea of the present application, some details well known in the art are omitted. According to the above description, those skilled in the art can fully understand how to implement the technical solution disclosed here.

The method and apparatus of the present application may be implemented in many ways. For example, the method and apparatus of the present application can be implemented by software, hardware, firmware or any combination of software, hardware, and firmware. The above order of the steps used for the method is for illustration purpose only, and the steps of the method of the present application are not limited to the order specifically described above, unless otherwise specifically stated. In addition, in some embodiments, the present application may also be implemented as a program recorded in the recording medium, which includes machine-readable instructions for implementing the method according to the present application. Thus, the application also covers the recording medium storing a program for the execution of the method according to the present application.

Finally, it should be noted that the above embodiments are only used to describe the technical solutions of the present application, instead of limiting them; although the present application is described in detail with reference to advantageous embodiments, those skilled in the art would appreciate that, the specific embodiments of the present application can still be modified or some technical features thereof can be the equivalently replaced, without departing from the spirit of the technical solution of the present application, and all these modifications and replacements shall fall within the scope of the technical solution sought for protection by the present application.

What is claimed is:

1. A control method for two or more air-conditioner water chilling units, comprising:
   receiving at least one standby request generated by at least one air-conditioner water chilling unit of the two or more air-conditioner water chilling units based on a standby condition;
   determining whether or not the at least one standby request includes a fault protection standby request;
   when the at least one standby request does not include the fault protection standby request, determining whether or not the number of air-conditioner water chilling units currently started is greater than or equal to two;
   when the at least one standby request does not include the fault protection standby request and when the number of air-conditioner water chilling units currently started is greater than or equal to two, determining whether or not two or more standby requests are received;
   generating standby sequence numbers of the air-conditioner water chilling units that send the standby requests according to the standby requests in a case that the at least one standby request does not include the fault protection standby request, the number of air-conditioner water chilling units currently started is greater than or equal to two, and two or more standby requests are received;
   acquiring a value indicating a current month; and
   closing the air-conditioner water chilling units that send the standby requests according to a preset rule based on the standby sequence numbers in the case that the at least one standby request does not include the fault protection standby request, the number of air-conditioner water chilling units currently started is greater than or equal to two, and two or more standby requests are received,
   wherein the closing the air-conditioner water chilling units that send the standby requests according to the preset rule based on the standby sequence numbers further comprises:
   comparing the standby sequence numbers, closing the air-conditioner water chilling units that send the standby requests in the order of the standby sequence numbers from small to large when the value is an odd number, and closing the air-conditioner water chilling units that send the standby requests in the order of the standby sequence numbers from large to small when the value is an even number.

2. The control method according to claim 1, after determining whether or not the standby request includes a fault protection standby request, further comprising:
   when the at least one standby request includes the fault protection standby request, generating at least one standby sequence number corresponding to the at least one air-conditioner water chilling unit that sends the at least one standby request based on the at least one standby request; and
   closing the at least one air-conditioner water chilling unit that sends the at least one standby request based on the at least one standby sequence number when the at least one standby request includes the fault protection standby request.

3. The control method according to claim 2, after determining whether or not the number of air-conditioner water chilling units currently started is greater than or equal to two, further comprising:
   when the at least one standby request does not include the fault protection standby request and when the number of air-conditioner water chilling units currently started is less than two, generating the standby sequence number corresponding to the air-conditioner water chilling unit that sends the standby request based on the standby request, and
   closing the air-conditioner water chilling unit that sends the standby request based on the standby sequence number in a case that the at least one standby request does not include the fault protection standby request and the number of air-conditioner water chilling units currently started is less than two.

4. The control method according to claim 3, wherein generating the standby request based on the standby condition comprises:
acquiring a temperature parameter of the air-conditioner water chilling unit that sends the standby request,
determining whether or not the temperature parameter of the air-conditioner water chilling unit that sends the standby request meets a first standby condition;
generating the standby request when the temperature parameter of the air-conditioner water chilling unit that sends the standby request meets the first standby condition;
acquiring a protection parameter of the air-conditioner water chilling unit that sends the standby request;
determining whether or not the protection parameter of the air-conditioner water chilling unit that sends the standby request meets the fault protection standby condition; and
generating the fault protection standby request when the protection parameter of the air-conditioner water chilling unit that sends the standby request meets the fault protection standby condition.

5. A computer-readable storage medium on which computer program instructions are stored, which, when executed by one or more processors, implement steps of the control method according to claim 1.

6. A control system for two or more air-conditioner water chilling units, comprising:
a processor; and
a non-transitory computer readable memory coupled to the processor, storing program instructions which, when executed by the processor, cause the processor to:
receive at least one standby request generated by at least one air-conditioner water chilling unit of the two or more air-conditioner water chilling units based on a standby condition,
determine whether or not the at least one standby request includes a fault protection standby request,
determine whether or not the number of air-conditioner water chilling units currently started is greater than or equal to two when the at least one standby request does not include the fault protection standby request,
determine whether or not two or more standby requests are received when the number of air-conditioner water chilling units currently started is greater than or equal to two and when the at least one standby request does not include the fault protection standby request,
generate standby sequence numbers of the air-conditioner water chilling units that send the standby requests according to the standby requests in a case that two or more standby requests are received, the number of air-conditioner water chilling units currently started is greater than or equal to two, and the at least one standby request does not include the fault protection standby request,
acquire a value indicating a current month, and
close the air-conditioner water chilling units that send the standby requests according to a preset rule based on the standby sequence numbers in the case that two or more standby requests are received, the number of air-conditioner water chilling units currently started is greater than or equal to two, and the at least one standby request does not include the fault protection standby request,
wherein closing the air-conditioner water chilling units that send the standby requests according to a preset rule based on the standby sequence numbers further comprises:
comparing the standby sequence numbers, closing the air-conditioner water chilling units that send the standby requests in the order of the standby sequence numbers from small to large when the value is an odd number, and closing the air-conditioner water chilling units that send the standby requests in the order of the standby sequence numbers from large to small when the value is an even number.

7. The control system according to claim 6, after determining whether or not the standby request includes a fault protection standby request, further comprising:
generating at least one standby sequence number corresponding to the at least one air-conditioner water chilling unit that sends the at least one standby request based on the at least one standby request when the at least one standby request includes the fault protection standby request, and
closing the at least one air-conditioner water chilling unit that sends the at least one standby request based on the at least one standby sequence number when the at least one standby request includes the fault protection standby request.

8. The control system according to claim 7, after determining whether or not the number of air-conditioner water chilling units currently started is greater than or equal to two, further comprising:
generating the standby sequence number corresponding to the air-conditioner water chilling unit that sends the standby request based on the standby request when the at least one standby request does not include the fault protection standby request and when the number of air-conditioner water chilling units currently started is less than two, and
closing the air-conditioner water chilling unit that sends the standby request based on the standby sequence number in a case that the at least one standby request does not include the fault protection standby request and the number of air-conditioner water chilling units currently started is less than two.

9. The control system according to claim 8, wherein generating the standby request based on the standby condition comprises:
acquiring a temperature parameter of the air-conditioner water chilling unit that sends the standby request,
determining whether or not the temperature parameter of the air-conditioner water chilling unit that sends the standby request meets a first standby condition;
generating the standby request when the temperature parameter of the air-conditioner water chilling unit that sends the standby request meets the first standby condition;
acquiring a protection parameter of the air-conditioner water chilling unit that sends the standby request;
determining whether or not the protection parameter of the air-conditioner water chilling unit that sends the standby request meets the fault protection standby condition; and generating the fault protection standby request when the protection parameter of the air-conditioner water chilling unit that sends the standby request meets the fault protection standby condition.

10. An air conditioning system, comprising:

the control system for two or more air-conditioner water chilling units according to claim 6.

* * * * *